Patented Jan. 4, 1949

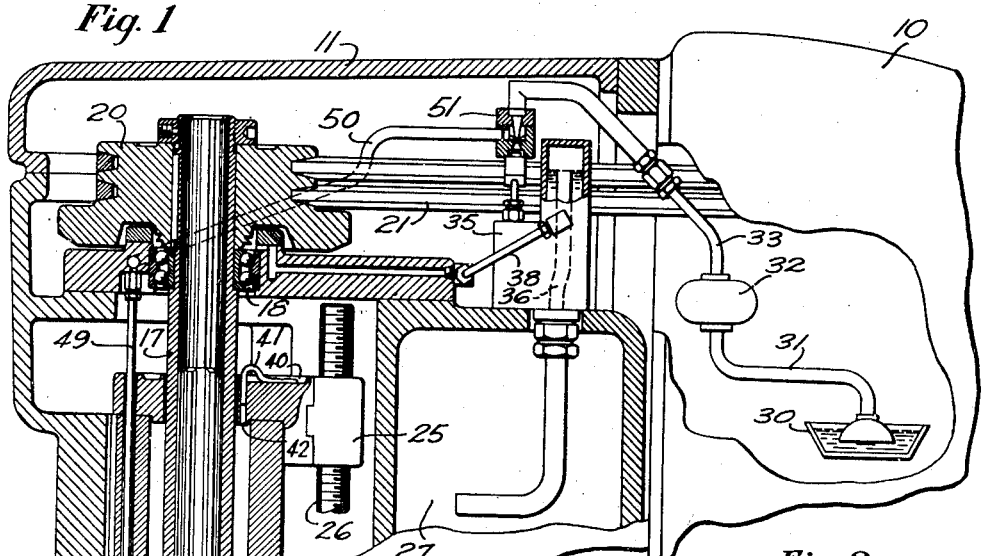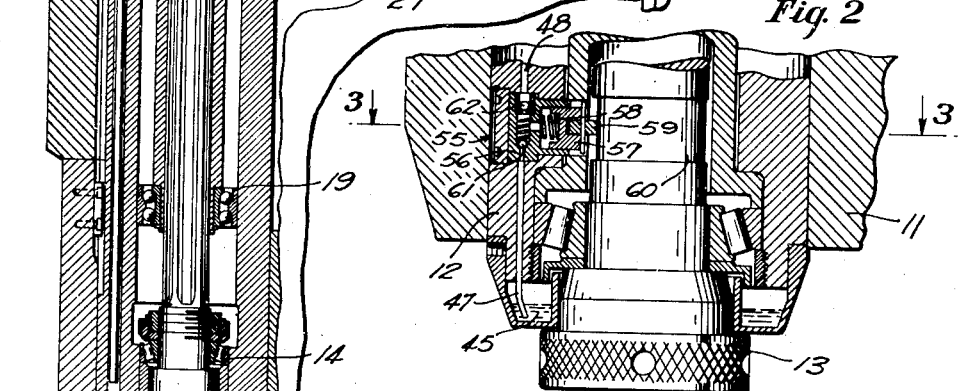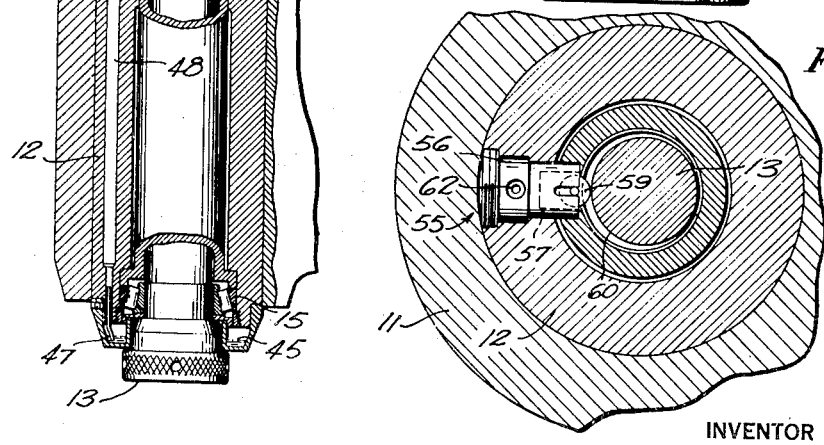

2,457,893

UNITED STATES PATENT OFFICE 2,457,893

MACHINE TOOL LUBRICATING SYSTEM

Emil J. Hlinsky, Milwaukee, Wis., assignor to Kearney & Trecker Corporation, West Allis, Wis., a corporation of Wisconsin Application February 23, 1945, Serial No. 579,459

3 Claims. (Cl. 184—6)

This invention relates generally to machine tool lubricating systems and more particularly to an arrangement for exhausting excess lubricant from a non-draining region in a machine tool.

In machine tools having mechanisms operating at high speeds, it is necessary that a copious supply of lubricant be furnished to the various moving parts. For this purpose, a circulating system is ordinarily provided whereby lubricant is drawn from a sump and delivered to the moving parts by a pump, the excess lubricant draining by gravity back into the sump. However, under some circumstances, lubricant must be supplied to machine parts in regions from which drainage by gravity to the sump is not feasible. This situation is met with, for example, in the case of the lower spindle bearing in a depending vertical spindle head of a machine tool such as a vertical boring or drilling machine. Since the spindle must turn rapidly, it is necessary that its supporting bearings be well lubricated, yet it is highly undesirable that lubricant be permitted to accumulate in the region of the lower bearing since it may leak from the bearing onto the work being machined.

It is, therefore, a general object of this invention to provide an improved lubricating system for a machine tool having an arrangement for withdrawing excess lubricant from a non-draining region for preventing leakage.

Another object is to provide an arrangement for exhausting excess lubricant from a non-draining area of a machine tool transmission housing through action of an aspirator operated by the flow of lubricant in the circulating system of the machine.

According to this invention, suction means are provided for withdrawing excess lubricant from a non-draining area within a machine tool housing, such as the region of the lower bearing of a depending spindle in a boring or drilling machine. To this end, an aspirator is connected with a suction conduit leading from the non-draining area. The aspirator may be operated by lubricant flowing in the pressure lubricating system and functions to reintroduce the excess lubricant into the lubricant stream.

The foregoing and other objects of the invention, which will become more fully apparent from the following detailed description, may be achieved by the particular lubricating and exhaust systems depicted by way of illustration in the accompanying drawing and described herein with reference to the several views, of which:

Figure 1 is a fragmentary view, taken largely in vertical section through the vertical head of a machine tool having a lubricating and exhaust system embodying the principles of the invention;

Fig. 2 is an enlarged fragmentary view in vertical section through the lower end of a machine tool spindle and quill generally similar to that shown in Fig. 1, but illustrating a modification of the invention including a pump driven by the spindle; and Fig. 3 is a view in horizontal section of the modified structure, taken on the plane represented by the line 3—3 in Fig. 2.

Although the invention is illustrated in the drawing as applied to a particular machine tool structure, it is to be understood that the excess lubricant exhausting system herein set forth may be utilized with equal advantage in withdrawing lubricant from any part of various other machine tools from which lubricant will not return to the circulating system by gravity.

Referring more specifically to the drawing and particularly to Fig. 1 thereof, the improved lubricating system of the present invention is there shown applied to the vertical spindle head of a jig boring machine of the type fully shown and described in copending application, Serial No. 610,593, filed August 13, 1945.

As shown, the jig boring machine comprises an upstanding frame or column structure 10, to which is attached a forwardly projecting vertical spindle head 11, only the upper part of the column being illustrated. Depending from the head 11 is a vertically disposed spindle carrying quill 12 arranged for vertical sliding movement in the head and carrying a rotatable tool supporting spindle 13, the arrangement being such that the spindle may be adjusted vertically through axial sliding movement of the quill in well known manner. As shown, the spindle 13 is rotatably mounted in the quill 12 by an upper anti-friction bearing 14 and a lower anti-friction bearing 15 from the latter of which the lower or tool supporting end of the spindle projects, the bearings being arranged in opposed relationship and adjusted against each other to support the spindle rigidly.

To provide a driving connection permitting the required vertical adjustment, the upper portion of the spindle 13 is splined and is slidably fitted within a complementary splined driving sleeve 17. As shown, the driving sleeve 17 is rotatably mounted in an upper anti-friction bearing 18 carried by the head 11 and in a lower anti-friction bearing 19 slidably mounted within the quill 12. A driving pulley 20 fixed on the upper end of the sleeve 17 serves to rotate the spindle 13 by power delivered through a suitable transmission mechanism including driving V-belts 21 engaging with grooves in the pulley 20.

Vertical axial movement of the quill 12 and the spindle 13 is effected in the usual manner by a screw and nut mechanism including a nut 25 that is secured to a cap constituting the upper end of the quill 12 and that has threaded engagement with a cooperating screw 26, which is rotatably mounted in the head 11. For effecting power feeding movement of the spindle, the screw 26 may be driven in well known manner by mechanism (not shown) housed within a compartment 27 in the spindle head 11.

Lubrication of the various moving parts of the machine is provided by a pressure circulating system shown in Fig. 1, part of the system being indicated diagrammatically. As shown in the diagram, lubricating oil is drawn from a sump 30 through a conduit 31 by a suitable pump 32, all indicated diagrammatically, the actual sump 30 preferably being disposed in the lower part of the machine in order that excess oil may drain back into it by gravity. From the pump 32, a pressure conduit 33 conveys the oil to the various moving parts requiring lubrication. In the spindle head 11, the oil discharges into a reservoir 35, the level in the reservoir being maintained constant by operation of an overflow conduit 36, through which surplus oil flows from near the top of the reservoir into the transmission compartment 27 for lubricating the quill actuating mechanism and thence drains by gravity back into the sump 30.

Oil for lubricating the anti-friction bearings of the spindle supporting and driving mechanism flows at constant pressure from a metering port in the side of the reservoir 35 through a conduit or passageway 38, which leads to the upper anti-friction bearing 18 that supports the spindle driving sleeve 17 in the head. From the upper bearing 18, the oil drains downward into a recess or trough 40 formed in the cap on the upper end of the quill 12. From the trough 40, a wick 41 leads into a passageway 42 extending through the cap of the quill and serves to feed a limited quantity of oil from the trough into the interior of the quill. Excess oil overflows from the trough 40 onto the nut 25 and screw 26, from which it drains back into the sump 30 by gravity. The oil flowing downward within the quill serves to lubricate the lower anti-friction bearing 19 supporting the sleeve 17. From the bearing 19, the oil flows down into the upper spindle bearing 14 and thence along the spindle 13 to the lower spindle bearing 15.

Excess lubricating oil accumulating in the region of the lower bearing 15 is guided into an annular trough or well 45, which encircles the spindle and is secured to the lower end of the quill 12. Since the lower end of the quill 12 is at a lower level than the interior of the head 11 and, furthermore, since the quill is arranged for vertical movement, the excess oil accumulating in the trough 45 will not drain by gravity from the trough 45 into the sump 30. Consequently, unless otherwise removed, the excess oil will eventually overflow the trough 45 and leak out of the bearing and down the projecting portion of the spindle from which it will drip onto the work being machined.

To obviate such undesirable leakage of lubricant from the spindle bearing, the machine has been provided, in accordance with the present invention, with an aspirator system that operates to exhaust excess oil from the non-draining region by suction. For this purpose, a suction nozzle 47 depends from the end of the quill into the trough 45 and serves to convey the excess oil into a bored channel 48 extending upwardly through the side wall of the quill 12. The bored channel 48 is arranged to receive a depending tube 49 in telescopic relationship to accommodate the vertical movement of the quill, the upper end of the tube being secured in the head 11 above the quill.

From the fixed upper end of the tube 49, a conduit 50 leads to an aspirator device 51, that operates to exert suction for withdrawing the excess lubricant. As shown, the aspirator 51 is connected in the pressure conduit 33, forming a connection between it and the reservoir 35. The system is so arranged that the oil forced from the pump 32 through the conduit 33 and the aspirator 51 causes it to operate in well known manner to exert suction upon the conduit 50. This suction effects withdrawal of the excess oil through the conduit from the non-draining region of the lower spindle bearing 15, the withdrawn oil from the conduit 50 co-mingling in the aspirator with the oil stream from the conduit 33 and being delivered with it into the lubricant reservoir 35.

In accordance with a modified form of the invention, the required suction is provided by a small pump 55, which may be mounted directly in the quill 12 and actuated by rotation of the spindle 13, as illustrated in Figs. 2 and 3. As best shown in Fig. 2, the pump 55 comprises a cylinder structure 56 fitted horizontally into the quill 12 near its lower end and carrying a cooperating piston 57. The piston 57 is pressed toward the spindle 13 by a spring 58 disposed within the cylinder, the piston being provided at its outer end, with a roller 59. As best shown in Fig. 3, the roller 59 engages and rolls upon an eccentric portion 60 of the spindle 13, the arrangement being such that, as the spindle 13 rotates, the piston 57 is caused to reciprocate within the cylinder.

Upon its outward movement under action of the spring 58, the piston 57 exerts suction to draw oil from the trough 45 through the nozzle 47, by way of a spring-biased inlet valve 61 in the pump body. When the piston 57 is forced inwardly by action of the eccentric 60 upon the roller 59, the oil is prevented by the valve 61 from returning into the nozzle 47 and is forced upwardly through an outlet valve 62 into the bored channel 48. Since the channel 48 leads to the top of the quill 12, it is not necessary, in this modification, to provide additional conduit for disposing of the excess oil, the oil being discharged directly from the channel 48 into the trough 40 in the cap at the top of the quill, from which it may return by gravity to the sump 30.

From the foregoing detailed descriptions of the structures and modes of operation of illustrative embodiments of the invention, it will be apparent that there has been provided a new and improved arrangement for withdrawing excess lubricant from depending elements of a machine tool, from which the lubricant would not otherwise return to the circulating system.

Although the illustrative embodiments of the invention have been described in considerable detail, for the purpose of making a full disclosure of practical, operative structures, by means of which the invention may be practiced, it is to be understood that the various novel features may be incorporated in other structural forms, without departing from the spirit and scope of the invention, as defined in the subjoined claims.

The principles of the invention having now been fully explained in connection with the foregoing description of illustrative embodying apparatus, the invention is hereby claimed as follows:

1. In a machine tool, a vertical spindle head, a spindle quill depending from and arranged for vertical axial adjustment relative to said head, a bearing in the lower end of said quill, a spindle rotatably mounted in and projecting downward from said bearing, a pressure lubricating system arranged to supply lubricant to said spindle head, means to convey lubricant to said bearing in said quill, a suction conduit arranged to withdraw excess lubricant from the region of said bearing, and an aspirator connected to said suction conduit and associated with said pressure lubricating system in manner to be operated by the flow of lubricant therethrough to exhaust said excess lubricant through said suction conduit.

2. In a machine tool of the type having a head carrying a vertically disposed tool driving spindle, a bearing in said head arranged to rotatably support the lower end of said spindle, mechanism in said head operatively connected to effect feeding movement of said spindle, a pressure lubricating system arranged to supply lubricating oil to said actuating mechanism and to said bearing, and an aspirator connected to be operated by oil flowing in said lubricating system and arranged to exhaust excess oil from the region of said bearing, whereby said oil is prevented from leaking from said bearing onto workpieces being operated upon by a tool driven by said spindle.

3. In a machine tool, a housing, a driving spindle projecting from said housing, a bearing rotatably supporting said spindle where it projects from said housing, mechanism in said housing operatively connected to actuate said spindle, a pressure lubricating system arranged to supply lubricating oil to said bearing and to said actuating mechanism, and an aspirator connected to be operated by oil flowing in said lubricating system and arranged to exhaust excess oil from the region of said bearing to prevent leakage of oil from said housing.

EMIL J. HLINSKY.

REFERENCES CITED

The following references are of record in the file of this patent:

UNITED STATES PATENTS

| Number | Name | Date |
|---|---|---|
| 1,492,653 | Sears | May 6, 1924 |
| 1,545,065 | Randolph | July 7, 1925 |
| 1,627,750 | Schmidt | May 10, 1927 |
| 1,830,679 | Schenck | Nov. 3, 1931 |
| 1,893,040 | Schmidt | Jan. 3, 1933 |
| 2,209,939 | Schauer | July 30, 1940 |
| 2,349,597 | Nenninger | May 23, 1944 |

FOREIGN PATENTS

| Number | Country | Date |
|---|---|---|
| 625,403 | Germany | Feb. 8, 1936 |